United States Patent Office 3,161,686
Patented Dec. 15, 1964

3,161,686
NOVEL ORGANOBORON COMPOUNDS
Herbert C. Brown, 1840 Garden St., West Lafayette, Ind.
No Drawing. Filed Mar. 30, 1960, Ser. No. 18,491
8 Claims. (Cl. 260—606.5)

The present invention is concerned with the discovery of novel organoboron compounds, particularly unique branched chain alkyl boron compounds.

This application is a continuation-in-part of my co-pending applications Serial No. 680,934, filed August 29, 1957, and Serial No. 857,508, filed December 7, 1959, and issued as U.S. Patent No. 3,078,310 on February 19, 1963.

An object of this invention is to provide novel organoboron compounds. A further object is to provide organoboron compounds having unique and diverse utility. A particular object of this invention is to provide novel branched chain hydrocarbon boron compounds and branched chain hydrocarbon boron hydride compounds. Other objects will be evident from the discussion which follows.

The above and other objects of this invention are accomplished by the provision of organoboron compounds having, linked to boron, at least 1 organo, preferably hydrocarbon, group which contains at least 5 carbon atoms and in which a carbon atom beta to the boron has 2 hydrocarbon groups and 1 hydrogen attached thereto. One embodiment of the invention comprises the tri-primary alkyl boranes in which the alkyl groups have a carbon atom, beta to the boron linkage, which has 2 hydrocarbon groups and 1 hydrogen attached thereto and the total number of carbon atoms in each alkyl group is at least 5. A particularly unique embodiment of the invention is the provision of dialkyl boron hydrides in which the alkyl groups are primary, the carbon atom beta to the boron atom has 2 hydrocarbon groups and 1 hydrogen attached thereto, and each alkyl group has at least 5 carbon atoms. A still further embodiment of the invention comprises the alkyl boron dihydrides in which the alkyl groups are primary to the boron atom, have 2 hydrocarbon groups and 1 hydrogen attached to the carbon atom which is beta to the boron, and have at least 5 carbon atoms in the alkyl group. Thus, particularly preferred trialkylboranes of the invention comprise tri(2-methyl-1-butyl) borane, tri(2-methyl-1-pentyl)borane, tri(3-methyl-2-butyl)borane, tri(2-methyl-3-pentyl)borane, and tri(3-methyl-2-pentyl)borane. Likewise, particularly preferred dialkyl boron hydrides comprise di(2-methyl-1-butyl)boron hydride, di(3-methyl-2-butyl)boron hydride, di(2-methyl-1-pentyl)boron hydride, di(2-methyl-3-pentyl)boron hydride, and di(3-methyl-2-pentyl)boron hydride. Other embodiments of the invention will be evident as the discussion proceeds.

The compositions of this invention are particularly unique organoboron compounds. By way of illustration, the trialkylboranes having the branched configuration in the beta carbon position are quite stable as well as being readily converted to isomers thereof by thermal treatment to move the boron down the chain past the branch to a new location. The resulting products can then be subjected to displacement reaction with olefins to produce more desirable olefinic products not obtainable by other means or in hydrocarbon streams. The dihydrocarbon boron hydrides, particularly the dialkyl boron hydrides wherein the carbon atom beta to the boron atom has the branched chain configuration, likewise possess highly unique properties even over the corresponding and preceding trialkylboranes. These compounds can be hydroborated with a different terminal olefin more effectively than the latter olefin can be hydroborated with, for example, diborane. Further, the previously known dialkyl boron hydrides readily disproportionate to the trialkylboranes, alkyl boron dihydrides, and diborane whereas the dialkyl boron hydrides of the present invention do not readily undergo such a disproportionation. The alkyl boron dihydrides of the invention wherein the alkyl group is branched in the beta carbon atom are likewise more stable than the previously known alkyl boron dihydrides and do not readily disproportionate to the trialkylboranes and diborane. Other unique characteristics and advantages of the compositions will be evident as the discussion proceeds.

As indicated above, the compositions of this invention comprise organoboron compounds having, linked to boron, at least 1 organo group, preferably hydrocarbon, and in which group a carbon atom beta to the boron has 2 hydrocarbon groups and 1 hydrogen attached thereto. The remaining valences of the boron are satisfied by the same or other organo groups, preferably hydrocarbon, or hydrogen. Each organo group of such organoboranes must have at least 5 carbon atoms therein. Such compositions can be depicted by the formula $$R_xBH_y$$

where $x$ is 1 through 3, $y$ is 0 through 2, and the sum of $x$ and $y$ is 3; and the R group is preferably a hydrocarbon group having at least 5 carbon atoms in which a carbon atom beta to the boron atom has 2 hydrocarbon groups and 1 hydrogen attached thereto. By such definition it is to be understood that cyclic moieties are also included wherein the boron atom is attached to a carbon atom of the ring and a beta carbon atom of the ring is further substituted with a hydrocarbon group or chain. Thus, illustrative examples of the compositions of this invention include tri(2-methyl-1-butyl)borane, tri(3-methyl-2-butyl) borane, tri(2-methyl-1-pentyl)borane, tri(2-methyl-3-pentyl)borane, tri(3-methyl-2-pentyl)borane, tri(2-methyl-1-octyl)borane, tri(2-methyl-1-decyl)borane, di(2-methyl-1-butyl)boron hydride, di(3-methyl-2-butyl)boron hydride, di(2-methyl-1-pentyl)boron hydride, di(2-methyl-3-pentyl)boron hydride, di(3-methyl-2-butyl)boron hydride, di(3-ethyl-2-pentyl)boron hydride, di(2-cyclohexyl-1-pentyl)boron hydride, di(2-phenyl-1-pentyl) boron hydride, di(2-methylcyclohexyl)boron hydride, 2-methyl-1-butyl boron dihydride, 2-methyl-1-pentyl boron dihydride, 3-methyl-2-butyl boron dihydride, 2-methyl-3-pentyl boron dihydride, 3-methyl-2-pentyl boron dihydride, 3-ethyl-2-pentyl boron dihydride, 2-methyl-1-decyl boron dihydride, 2-methylcyclohexyl boron dihydride, and the like. While the above illustrative examples show only hydrocarbon and hydrogen groups attached to the boron which are the preferred embodiments, it is to be understood that the hydrocarbon groups can be further substituted with other branched chains or ligands including, for example, ether groups, halogens, keto groups and the like. Generally, the hydrocarbon groups attached to the boron will each contain up to and including about 12 carbon atoms. It is preferable that the hydrocarbon groups linked to the boron be only the branched chain alkyl groups having a total of between 5 and 10 carbon atoms therein with the beta carbon atom having attached thereto a methyl group and an alkyl group, preferably straight chain of at least 2 carbon atoms. Likewise, in a particularly preferred embodiment, the compounds wherein the aforementioned alkyl groups are attached to the boron forming primary linkages are especially preferred because of their more ready preparation, greater stability and utility. Additionally, such compounds which are the trialkyl or dialkyl boron hydrides are even more particularly preferred embodiments because of their greater stability and utility. Accordingly, a particularly unique and preferred class of compounds of the invention comprises tri(2-methyl-1-butyl)borane, tri(2-methyl-1- pentyl)borane, tri(2-methyl-1-hexyl)borane, tri(2-methyl-1-octyl)borane, and tri(2-methyl-1-decyl)borane. Another particularly unique class of such compounds comprises di(2-methyl-1-butyl)boron hydride, di(2-methyl-1-pentyl)boron hydride, di(2-methyl-1-hexyl)boron hydride, di(2-methyl-1-octyl)boron hydride, and di(2-methyl-1-decyl)boron hydride.

The novel compounds will be more adequately illustrated by the following examples wherein all parts are by weight.

Example I

Into a reactor equipped with internal agitation, external heating or cooling means and a means for introducing and discharging reaction products is added 210 parts of 2-methyl-1-butene. Then 15 parts of diborane are bubbled through the reaction mixture for 1 hour maintaining the temperature at room temperature. In this manner tri(2-methyl-1-butyl)borane is obtained in high yield and can be employed in most applications without further purification. Tri(2-methyl-1-butyl)borane is a colorless liquid which boils at 80° C. at a pressure of 1.3 mm. of mercury. It has a density of 0.807 at 22° C. and an index of refraction of $n_D^{23}=1.4350$. It is essentially insoluble in and stable toward water, but is soluble in most common organic solvents such as benzene, diethyl ether, tetrahydrofuran, triethylamine, and the like. On oxidation with alkaline hydrogen peroxide it is converted to sodium borate and 2-methyl-1-butanol in essentially quantitative yield. When it is heated over a prolonged period at about 150° C., it is converted into isomers thereof, predominantly the tri(3-methyl-1-butyl)borane. Because of its flammability, it is best handled in an inert atmosphere.

Example II

On treatment of 210 parts of 2-methyl-1-butene with 22 parts of diborane, di(2-methyl-1-butyl)boron hydride is obtained in good yield. This compound reacts with water to liberate one mole of hydrogen per mole of di(2-methyl-1-butyl)boron hydride. Subsequent oxidation with alkaline hydrogen peroxide then results in the formation of 2-methyl-1-butanol in essentially quantitative yield.

Example III

In this run, 33.6 parts of 2-methyl-2-butene (otherwise known as trimethylethylene) were reacted in the dimethyl ether of diethylene glycol at 0° C. by adding a solution thereof to 6.8 parts of sodium borohydride in the dimethyl ether of diethylene glycol and then adding 34 parts of boron trifluoride-etherate. In this manner di(3-methyl-2-butyl)boron hydride was obtained in good yield. In order to characterize the product, it was then reacted with 1-hexyne, 16.4 parts, for 30 minutes at 0° C. At the end of this period the excess hydride product was destroyed with ethylene glycol. The product was then oxidized at 0° C. with 150 parts of 15 percent hydrogen peroxide adding sufficient alkali to maintain the solution at a pH between 8 and 9. The reaction mixture was then treated with water and the aldehyde and alcohol formed taken up in ether. An aliquot was analyzed for n-hexaldehyde. The 2,4-dinitrophenylhydrazone obtained melting at 104° C. indicated a yield of 88½ percent. The alcohol was identified as 3-methyl-2-butenol formed in essentially quantitative yield.

Example IV

Employing the procedure of Example I, 252 parts of 2-methyl-1-pentene are reacted with 15 parts of diborane in the diethyl ether of diethylene glycol at 25° C. for 1 hour. Tri(2-methyl-1-pentyl)borane is obtained in essentially quantitative yield in solution in the ether. When the product is oxidized with aqueous alkaline hydrogen peroxide 2-methyl-1-pentanol is obtained in essentially quantitative yield.

When this procedure is repeated substituting 2-methyl-2-pentene for 2-methyl-1-pentene, di(2-methyl-3-pentyl) boron hydride is obtained. With a 24 hour reaction period, tri(2-methyl-3-pentyl)borane is obtained in good yield.

Example V

On treating 252 parts of 2-methyl-1-pentene with 22 parts of diborane, di(2-methyl-1-pentyl)boron hydride is obtained in good yield. When the product is hydrolyzed and oxidized as in Example II, hydrogen and 2-methyl-1-pentanol are produced.

Example VI

When Examples II or V are repeated substituting 44 parts of diborane in each instance, 2-methyl-1-butyl boron dihydride and 2-methyl-1-pentyl boron dihydride are obtained respectively in good yield. Hydrolysis and oxidation of these compounds as in Example II gives 2 moles of hydrogen per mole of alkyl boron dihydride and good yields of the corresponding alcohols, 2-methyl-1-butanol and 2-methyl-1-pentanol.

Example VII

When diborane is reacted with α-pinene in excess in the presence of diethyl ether, di(α-pinyl)boron hydride is obtained in good yield. Oxidation as in Example I leads to the formation of isopinocampheol in good yield.

Example VIII

When Example VII is repeated with exception that β-pinene is employed, tri(β-pinyl)borane is obtained in good yield. Oxidation as in Example I leads to the formation of dihydromyrtenol in good yield.

Example IX

Employing the procedure of Example I, 15 parts of diborane are reacted with 456 parts of 2-cyclohexyl-1-pentene in the presence of tetrahydrofuran as catalyst and solvent at 50° C. for 15 minutes. Tri(2-cyclohexyl-1-pentyl)borane is obtained in high yield.

Example X

In this run, 40 parts of sodium borohydride are dissolved in 1000 parts of the dimethyl ether of diethylene glycol. Then 440 parts of 2-phenyl-1-pentene are added to the mixture and 150 parts of boron trifluoride etherate are added thereto at room temperature. After 15 minutes reaction time the reaction mixture is filtered and tri(2-phenyl-1-pentyl)borane dissolved in the ether is obtained in high yield.

Example XI

Tri(2-methyl-1-decyl)borane is obtained in high yield and purity when 462 parts of 2-methyl-1-decene are reacted with 15 parts of diborane at room temperature for 4 hours.

Example XII

When 288 parts of 1-methylcyclohexene are reacted with 15 parts of diborane in the diethyl ether of diethylene glycol at 30° C. for 1 hour, di(2-methyl-1-cyclohexyl) boron hydride is obtained in good yield.

Example XIII

Into the reactor employed in Example I was added 0.3 mole of 2,4,4-trimethyl-2-pentene (otherwise known as 2-diisobutylene) along with 95 parts of the dimethyl ether of diethylene glycol. Diborane was introduced subsequent to nitrogen flushing over a period of 3 hours at room temperature. In this manner di(2,4,4-trimethyl-2-pentyl)boron hydride was obtained in good yield. When this product was heated for 2 hours under the reflux conditions in the ether solution and then oxidized and hydrolyzed employing 40 parts of 30 percent aqueous hydrogen peroxide and 40 parts of 3 molar aqueous sodium hydroxide, there resulted an 80 percent yield of 2,4,4-trimethyl-1-pentanol illustrating the isomerization of the 2,4,4-trimethyl-2-pentyl boron groups by the treatment prior to the oxidation to 2,4,4-trimethyl-1-pentyl boron groups.

The above examples have been presented by way of illustration of the novel products of this invention and their method of manufacture. It will now be evident that other similar products as discussed herein can be produced in analogous manner.

The above examples have illustrated a preferred method for the production of the novel products of this invention involving the reactions of diborane or other $BH_3$ producers with an appropriate olefin, particularly in the presence of ethers. The ethers and other Lewis base materials catalyze the hydroboration reaction. Further details concerning this method of producing the compounds of the present invention are presented in my co-opending application, S.N. 680,934, filed August 29, 1957. Accordingly, the disclosures contained therein are pertinent to a preferred method for preparing the products of this invention and are incorporated herein by the foregoing reference. Other methods for the preparation of the products will now be evident.

As indicated in the aforementioned co-pending application and the above examples, the novel products of this invention can be produced in various organic media, particularly the hydrocarbons, ethers, and tertiary amines. When ethers or tertiary amines are employed, weak complexes of the organoboron compounds are formed which are more stable than the uncomplexed products. While in general any of the ethers are applicable, the cyclic ethers and polyethers are particularly preferred such as tetrahydrofuran and the lower alkyl ethers of the ethylene glycols containing up to about 10 carbon atoms including the dimethyl ether of diethylene glycol, the diethyl ether of diethylene glycol, the methyl ethyl ether of diethylene glycol, and the like ethers of triethylene and tetraethylene glycol. Likewise, the lower trialkyl amines are particularly preferred amines to be employed, especially those wherein each alkyl group contains up to and including about 8 carbon atoms such as trimethylamine, triethylamine, tripropylamine, triisobutylamine, and trioctylamine. The ethers or amines are readily separated from the organoboron product by heating to temperatures to effect dissociation. The ethers and amines will form complexes containing 1, 2, or 3 moles thereof per mole of the organoboron compound.

The novel products of the present invention are of considerable utility. By way of illustration, the designated trihydrocarbon boranes, e.g. tri(2-methyl-1-butyl)borane, tri(2-methyl-1-pentyl)borane and the like can be isomerized by heating them preferably in the presence of a minor amount of a boron-hydride bonded material, e.g. di(2-methyl-1-butyl)boron hydride, at temperatures between 160 to 225° C. to produce predominantly tri(3-methyl-1-butyl)borane which can then be reacted with an olefin as, for example, propylene to release the corresponding 3-methyl-1-butene olefin. Further, they can be reacted with metal salts or oxides, for example, lead oxide, preferably in the presence of a minor amount of alkali, in an aqueous system to produce the corresponding tetraalkyllead compound. The dialkyl boron hydrides are eminently suited as selective hydroborating reactants, especially the secondary dialkylboron hydrides of this invention. For example, when di(3-methyl-2-butyl)boron hydride is reacted with a mixture of 1-hexene and 2-hexene at temperatures up to about 50° C., especially in ethers, for about ½ hour, essentially all of the 1-hexene is reacted and thus separated from the 2-hexene. Likewise, when a dialkyl boron hydride of this invention, for example, di(3-methyl-2-butyl)boron hydride is reacted at about 0 to 50° C., especially in ethers, with a mixture containing cyclohexenes and cyclopentenes, the cyclopentenes react preferentially and faster leaving the cyclohexenes essentially unreacted. Another interesting use of the dialkyl boron hydrides is illustrated by the fact that di(3-methyl-2-butyl)boron hydride reacts with 4-vinyl cyclohexene whereby the vinyl linkage is hydroborated but the ring unsaturation is uneffected. Similarly, when limonene is reacted with di(3-methyl-2-butyl)boron hydride the side chain olefinic linkage is reacted and the ring unsaturation is uneffected. Further, such compounds react more rapidly with cis olefins than with trans olefins. Thus, a mixture of cis- and trans-pentene-2 can be reacted with di(3-methyl-2-butyl)boron hydride to effect the separation of the olefins. Still further, when the dialkyl boron hydrides of the invention are reacted with 1-hexene at about 0 to 50° C., especially in an ether, a greater proportion of n-hexyl hydroboration is obtained than when $BH_3$ or diborane is reacted with 1-hexene. Similar results are obtained when the dialkyl boron hydrides of the invention are reacted with styrene. In this instance, the enhancement in yield obtained of normal or primary hydroboration products is of the order of about 15 percent and higher than obtained when diborane is reacted with styrene. The dialkyl boron hydrides and alkyl boron dihydrides, e.g. di(2-methyl-1-pentyl)boron hydride and 2-methyl-1-butyl boron dihydride can be employed as selective reducing agents, for example, the reduction of aldehydes to alcohols. The aforementioned uses are also applicable to the ether and amine complexes of the novel products of the invention which have the additional advantage of even greater stability and "built in" catalysts. Other uses of the products of this invention will now be evident.

Having thus described the novel products and a method for their manufacture, it is not intended that the invention be limited except as set forth in the following claims.

I claim:
1. Di(2-methyl-1-pentyl)boron hydride.
2. Di(2-methyl-3-pentyl)boron hydride.
3. Di(2-methyl-1-butyl)boron hydride.
4. Di(3-methyl-2-butyl)boron hydride.
5. Di(α-pinyl)boron hydride.
6. Tri(β-pinyl)borane.
7. Dialkylboron hydrides in which each alkyl group contains from 5 to about 12 carbon atoms and has a chemical structure such that a carbon atom beta to the boron atom is a tertiary carbon atom.
8. Dihydrocarbon boron hydrides in which each of 2 of the 3 boron valences is satisfied by a carbon to boron bond and wherein the remaining valence is satisfied by a hydrogen to boron bond, each of said carbon to boron bonds constituting a chemical linkage between the boron atom and a saturated hydrocarbon group which contains at least 5 carbon atoms, each such hydrocarbon group being further characterized in that it has a chemical structure such that a carbon atom beta to the boron atom is a tertiary carbon atom.

References Cited by the Examiner

UNITED STATES PATENTS

| | | | |
|---|---|---|---|
| 2,862,952 | 12/58 | Groszos | 260—606.5 |
| 2,880,243 | 3/59 | Hennion | 260—606.5 |
| 3,047,358 | 7/62 | Jenker | 260—606.5 X |
| 3,049,407 | 8/62 | Koster | 260—606.5 X |
| 3,051,754 | 8/62 | Jenker | 260—606.5 X |

OTHER REFERENCES

Hennion et al.: Am. Chem. Soc., Abstracts of Papers, 130th meeting, 1956, pages 53–0.

Hennion et al.: J. Am. Chem. Soc., vol. 79, pp. 5190–1 (1957).

Hennion et al.: J. Am. Chem. Soc., vol. 80, pp. 617–9 (1958).

Hennion et al.: J. Am. Chem. Soc., vol. 80, pp. 3481–2 (1958).

Schlesinger et al.: Chem. Reviews, vol. 31, pp. 13–5 (1942).

TOBIAS E. LEVOW, *Primary Examiner.*

ROGER L. CAMPBELL, LEON D. ROSDOL, CARL D. QUARFORTH, *Examiners.*